United States Patent
Reynolds et al.

(10) Patent No.: US 7,798,132 B2
(45) Date of Patent: Sep. 21, 2010

(54) AIRCRAFT FUEL TANK ASSEMBLY

(75) Inventors: Andrew David Reynolds, Bristol (GB); Michael David Ward, Bristol (GB)

(73) Assignee: Airbus UK Limited, Bristol (GB)

(*) Notice: Subject to any disclaimer, the term of this patent is extended or adjusted under 35 U.S.C. 154(b) by 110 days.

(21) Appl. No.: 12/097,302

(22) PCT Filed: Dec. 1, 2006

(86) PCT No.: PCT/GB2006/004491

§ 371 (c)(1),
(2), (4) Date: Jun. 13, 2008

(87) PCT Pub. No.: WO2007/071908

PCT Pub. Date: Jun. 28, 2007

(65) Prior Publication Data

US 2008/0308076 A1    Dec. 18, 2008

(30) Foreign Application Priority Data

Dec. 22, 2005    (GB) .................................. 0526206.8

(51) Int. Cl.
*F02M 37/08* (2006.01)
*F02M 37/04* (2006.01)
(52) U.S. Cl. .................................. 123/509; 244/135 R
(58) Field of Classification Search .................. 123/509, 123/497, 446, 41.31; 417/410.1, 423.8, 423.7, 417/372, 366; 244/172.3, 172.2, 135 R
See application file for complete search history.

(56) References Cited

U.S. PATENT DOCUMENTS

| 2,889,955 | A |  | 6/1959 | Naulty et al. |
| 3,539,272 | A |  | 11/1970 | Howard et al. |
| 3,827,455 | A |  | 8/1974 | Lee |
| 3,924,773 | A |  | 12/1975 | Wilkinson |
| 4,664,134 | A |  | 5/1987 | Pera |
| 5,454,697 | A | * | 10/1995 | Nakanishi ................. 417/423.3 |
| 5,613,844 | A | * | 3/1997 | Tuckey et al. ............... 417/366 |
| 5,908,286 | A |  | 6/1999 | Clemmons |
| 6,302,144 | B1 |  | 10/2001 | Graham et al. |
| 6,450,193 | B1 |  | 9/2002 | Constantinou |
| 7,513,755 | B2 |  | 4/2009 | Geisinger et al. |

FOREIGN PATENT DOCUMENTS

GB    150053    8/1920

OTHER PUBLICATIONS

UK Search Report for GB0526206.8 dated Apr. 20, 2006.
ISR and Written Opinion for PCT/GB2006/004491 dated Mar. 15, 2007.
EP Exam Report for Application No. 06 808 717.0 dated Nov. 23, 2009.

* cited by examiner

*Primary Examiner*—Mahmoud Gimie
(74) *Attorney, Agent, or Firm*—Lowe Hauptman Ham & Berner LLP

(57) ABSTRACT

An aircraft fuel tank assembly includes a tank for holding fuel, a canister and a fuel pump assembly. The fuel pump assembly includes: an electric motor, a pump and an electronics unit. The electronics unit and canister are arranged so that, in use, a dry bay is defined between the electronics unit and the canister.

20 Claims, 4 Drawing Sheets

Prior art

Prior art

AIRCRAFT FUEL TANK ASSEMBLY

RELATED APPLICATIONS

The present application is based on International Application Number PCT/GB2006/004491 filed Dec. 1, 2006, and claims priority from British Application Number 0526206.8 filed Dec. 22, 2005, the disclosures of which are hereby incorporated by reference herein in their entirety.

TECHNICAL FIELD

This invention relates to fuel tank assemblies. More specifically, it relates to aircraft fuel tank assemblies, and fuel pump assemblies for use in such fuel tank assemblies.

BACKGROUND OF THE INVENTION

Fuel pump assemblies are often placed in wings of aircraft, adjacent to, or inside, fuel tanks housed within the wing. A fuel pump assembly may act as a transfer pump, used to transfer fuel from one fuel tank to another, or as a boost pump, to feed fuel to the aircraft engines.

The placing of aircraft fuel pump assemblies inside aircraft fuel tanks results in a need to observe stringent safety precautions in order to avoid or mitigate the risk of ignitions and explosions.

It is also desirable that aircraft fuel pump assemblies are removable for maintenance.

Aircraft fuel pump assemblies are traditionally powered by electric motors of the asynchronous induction or brushed permanent-magnet type. Such motors do not require any electronic control elements. In such a system, a pump motor is supplied with a fixed frequency 400 Hz 3-phase alternating current (ac) or a direct current (dc) electrical supply. When electrical power is supplied the motor rotates and, in turn, causes pump rotation at approximately constant speed.

An example of such a system is shown in FIG. 1.

The fuel pump assembly of FIG. 1 is located in a wing of an aircraft and contained in a fuel flooded canister. The canister projects into a fuel tank, housed in the wing. The canister is secured and sealed to the inside of the fuel tank wall.

A pump and electric motor, connected to form the fuel pump assembly, are removably housed within the canister. The fuel pump assembly can be removed from its position in the canister by unbolting a cover plate, located on the outside of the fuel tank, accessible from the outside of the wing and withdrawing the pump and attached motor. Sliding valves and check valves automatically close off the inlet and outlet of the pump, thereby allowing removal of the pump assembly without the need to drain fuel from the fuel tank.

Improvements in high-power, solid state switching electronics has allowed more efficient motors of the brushless or switched reluctance type to be developed. Such motors may be powered by an electric supply provided by variable frequency generators running at a speed proportional to the aircraft running speed.

The switching electronics required for such an improved motor manage high currents and voltages and require cooling. Similarly, a converter for converting variable frequency ac to dc is often also provided with the electronics. The converter also requires cooling.

An example of a fuel pump assembly including an improved motor is shown in FIG. 2.

The fuel pump assembly of FIG. 2 is located in a wing of an aircraft, within a fuel flooded canister. The canister projects into a fuel tank housed in the wing. The canister is secured and sealed to the inside of the fuel tank wall.

The fuel pump assembly is formed by connecting a pump, an electric motor and an electronics unit.

In use, the fuel pump assembly acts to transfer fuel from the pump inlet to the outlet. The pump also acts to force a portion of the fuel through each of the electric motor and the electronics unit, thereby effecting cooling.

The fuel pump assembly is removably housed within the canister and can be removed from its position within the canister by unbolting a cover plate and withdrawing the fuel pump assembly as described in relation to the arrangement shown in FIG. 1.

The present invention seeks to provide an improved fuel tank assembly. Alternatively or additionally, the present invention seeks to provide a fuel tank assembly which mitigates or eliminates one or more of the disadvantages associated with the arrangements illustrated by FIG. 1 or by FIG. 2 of the attached drawings.

SUMMARY OF THE INVENTION

The present invention provides an aircraft fuel tank assembly comprising a tank for holding fuel, a canister and a fuel pump assembly, said fuel pump assembly comprising an electric motor, a pump and an electronics unit, the electronics unit and canister being so arranged that, in use, there is defined a dry bay between the electronics and the canister.

In embodiments of the invention, the provision of a dry bay separates the high power control electronics housed within the electronics unit from the fuel tank, thereby minimising contact between the hot electronics and the flammable fuel.

The dry bay may be filled with air or another suitable insulating material. The dry bay may also extend substantially around the electric motor.

The aircraft fuel tank assembly may be housed inside a wing of an aircraft. Of course, the aircraft fuel tank assembly may be located wherever there is a fuel tank.

The dry bay may be provided with a witness drain. In such an arrangement, the dry bay may be in direct communication with the outside of a part of the aircraft housing the fuel tank assembly. Since the dry bay lies adjacent to the fuel tank connection of the dry bay to the outside of the part of the aircraft housing the fuel tank assembly allows early detection of a breach of the dry bay. A breach of a wall of the dry bay adjacent to the fuel tank is likely to result in a proportion of fuel leaking into the dry bay. Fuel in the dry bay can, if a witness drain is provided, be detected visually as a leak. The dry bay may also be adjacent to the electronics unit thereby separating the electronics unit from the fuel tank.

The electronics unit may be adjacent to the inside surface of the fuel tank wall. Alternatively, the pump may be adjacent to the inside surface of the fuel tank wall. The inside surface of the fuel tank wall may be located at an open end of the canister.

Placing of the electronics unit adjacent to the inside surface of the fuel tank wall allows easy access to control electronics, housed in the electronics unit.

The fuel pump assembly comprising the motor, pump and electronics unit may form a single integrated unit. In such a case the motor, pump and electronics unit are all connected together.

For a typical pump in a large aircraft, the electric power supplied is often between 0.5 kw and 5 kw. As a result of the location of the assembly within an aircraft, adjacent to a fuel tank, the physical path between control electronics housed within the electronics unit and the electric motor is kept as short as possible thereby minimising radiated emissions and waveform deterioration. Connecting the motor, pump and electronics unit to form a single integrated unit allows the physical path between the electronics unit and electric motor to be kept to a minimum.

The electronics unit may further comprise a housing, the canister and the electronics unit housing together serving to define the dry bay.

The housing may surround the electronics unit. The electronics unit housing may have insulating properties such that small electrical or electronic faults within the electronics unit may be substantially contained within the housing.

In an extreme scenario, the electronics unit housing and the dry bay may act together as follows: a low power electrical fault inside the electronics unit may, over time, defeat precautions inside the casing and create a hole in the wall of the casing. In such a case, the dry bay between the electronics unit and the canister may in embodiments of the invention provide an extra layer of protection.

The canister may be formed by appropriately shaping the fuel tank wall or may take the form of a separate insert.

The canister may, for example, be sealed to an inside surface of the fuel tank. Locating the fuel pump assembly within a canister assists easy removal of the fuel pump assembly from the aircraft fuel tank assembly for maintenance. The canister may have an open end, in the region of the inside surface of the fuel tank wall. The canister may be closed by a cover plate. Removal or the opening of said cover plate may allow the fuel pump assembly to be withdrawn from the canister. The fuel pump assembly may be removably located within the canister. The canister may, in use, be partly flooded with fuel.

The region of the canister that serves to define the dry bay may be arranged or constructed to withstand a typical force exerted by an ignition or explosion of any fuel or fuel vapour present within the dry bay.

The electronics unit may be cooled by fuel that is passed through the electronics unit. The electronics unit may include a channel for passing fuel through the electronics unit. That channel may lead from the pump, and may return to the pump. The pump may, in use, act to force a proportion of the fuel through the channel in the electronics unit. The fuel may be forced through the channel as a result of regions of high and low pressure created by the pump. The provision of said channel allows the electronics unit to be cooled, at least in part, by a flow of fuel through the channel.

The motor may be cooled by fuel that is passed through the motor. The motor may include a channel for passing fuel through the motor. That channel may lead from the pump, and may return to the pump. The pump may, in use, act to force a proportion of the fuel through the channel in the motor. The fuel may be forced through the channel as a result of regions of high and low pressure created by the pump. The provision of said channel allows the motor to be cooled, at least in part, by a flow of fuel through the channel.

Each of the channels mentioned above (passing through the electronics unit or the motor) may be connected to the pump via a flame trap. The flame traps prevent small explosions in the motor or electronics unit from reaching the pump and any connected pipes or the fuel tank.

A pump, for example the pump of the pump assembly, may be used as a transfer pump, for transferring fuel from one fuel tank to another, or as a boost pump to feed fuel to an aircraft engine. The pump may be a remote inlet pump. Such a pump may be used in an application where it is not possible to mount the pump at the lowest point of the fuel tank. In such a pump, the pump is capable of priming itself by suction. Since a remote inlet pump does not require fuel to be able to flow directly into the pump to prime it, and it is therefore possible to place the electronics unit directly on the fuel tank wall, below the pump and the motor.

The pump may be a direct inlet pump. A direct inlet pump relies on a flow of fuel into it to prime it and in general that requires fuel to enter the pump under the action of gravity. The pump may be placed on the fuel tank floor, and the motor and electronics unit located above the pump.

The present invention also provides an aircraft including a fuel tank assembly as described herein.

The present invention also provides a kit of parts for forming a fuel tank assembly according to the invention as described herein. The kit may for example include a canister and an electronics unit suitable for use with a fuel pump assembly, said electronics unit and canister being so arranged that, in use when the kit is assembled as a part of an aircraft fuel tank assembly, there is defined a dry bay between the electronics unit and the canister. The kit may further include parts for forming, together with the electronics unit, at least part of a fuel pump assembly, such parts for example comprising a pump and/or an electric motor for a pump.

DESCRIPTION OF THE DRAWINGS

By way of example, certain embodiments of the invention will now be described, by way of example only, with reference to the accompanying drawings in which.

DETAILED DESCRIPTION

There now follows a detailed description of two prior art fuel tank assemblies in order for the reader to gain a full understanding of the illustrated embodiments of the present invention.

Figure 1:
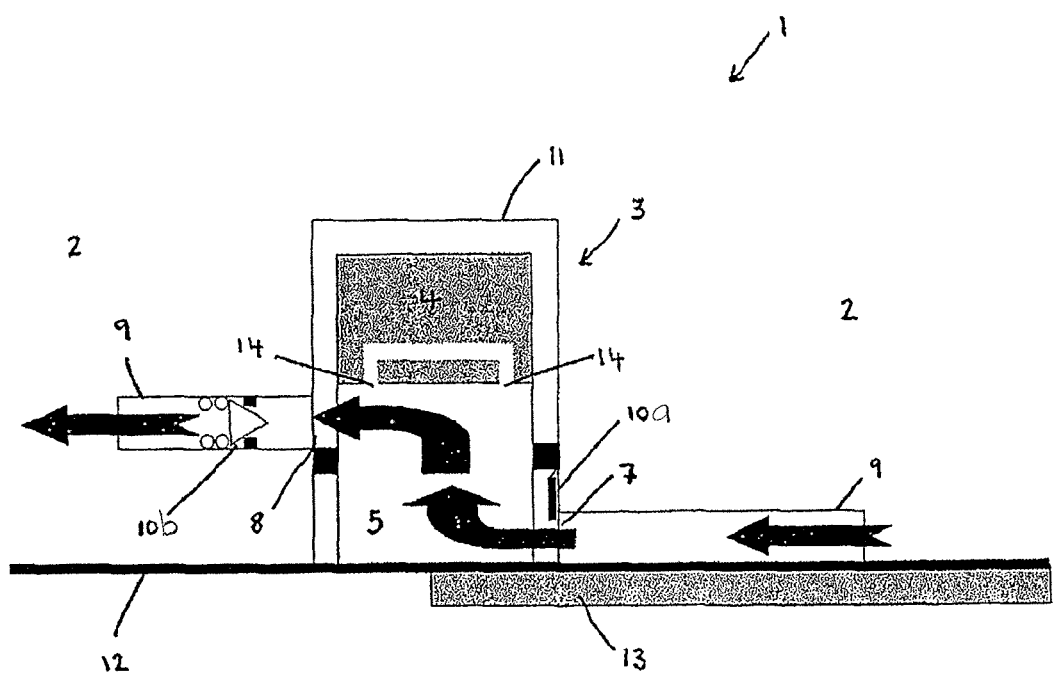
FIG. 1 is a schematic representation of a fuel tank assembly according to a first prior art arrangement.

FIG. 1 shows a fuel tank assembly 1 according to a first prior art arrangement, the fuel tank assembly being located in the wing of an aircraft. The fuel tank assembly includes a fuel tank 2 and a fuel pump assembly 3. The pump assembly 3 includes an electric motor 4 and a pump 5. The pump has an inlet 7 and an outlet 8, each linked to the fuel tank 2 by fuel pipes 9, via a slide valve and a check valve 10a and 10b respectively.

The pump assembly 3 is housed in a canister 11, projecting into the fuel tank 2 from the lower skin of the aircraft wing. The canister is sealed to the inside tank wall 12.

The electric motor 4 is typically of an asynchronous induction or brushed permanent-magnet type and is supplied with either a fixed frequency 400 Hz 3-phase alternating current or with a direct current electrical supply 13 as appropriate. The rotation of the pump 5 is enabled by the design of the motor 4. Pump rotation, at approximately constant speed, is achieved when the electrical power supply is applied to the motor 4.

When the pump 5 rotates, fuel is taken in at the inlet 7 and expelled from the pump at the outlet 8. The general flow of fuel through the pump assembly is shown by arrows.

A proportion of the fuel in the pump is also passed through the electric motor 4 to effect cooling. Appropriately located flame traps 14 prevent small explosions in the motor 4 from reaching the pump 5, pipes and fuel tank 2.

The canister 11 is, whilst the pump assembly is in operation, flooded with fuel. The pump assembly 3 can be removed for maintenance by unbolting a cover plate (not shown) accessible from the outside of the wing of the aircraft. The cover plate is located on the outside of the fuel tank on the lower wing.

Once the cover plate is unbolted, the pump assembly 3 may be removed. The sliding valves and check valves 10a, 10b automatically close off the fuel pipes 9 at the pump inlet 7 and outlet 8, enabling removal of the pump assembly 3 without the need to drain all of the fuel from the fuel tank.

Figure 2:
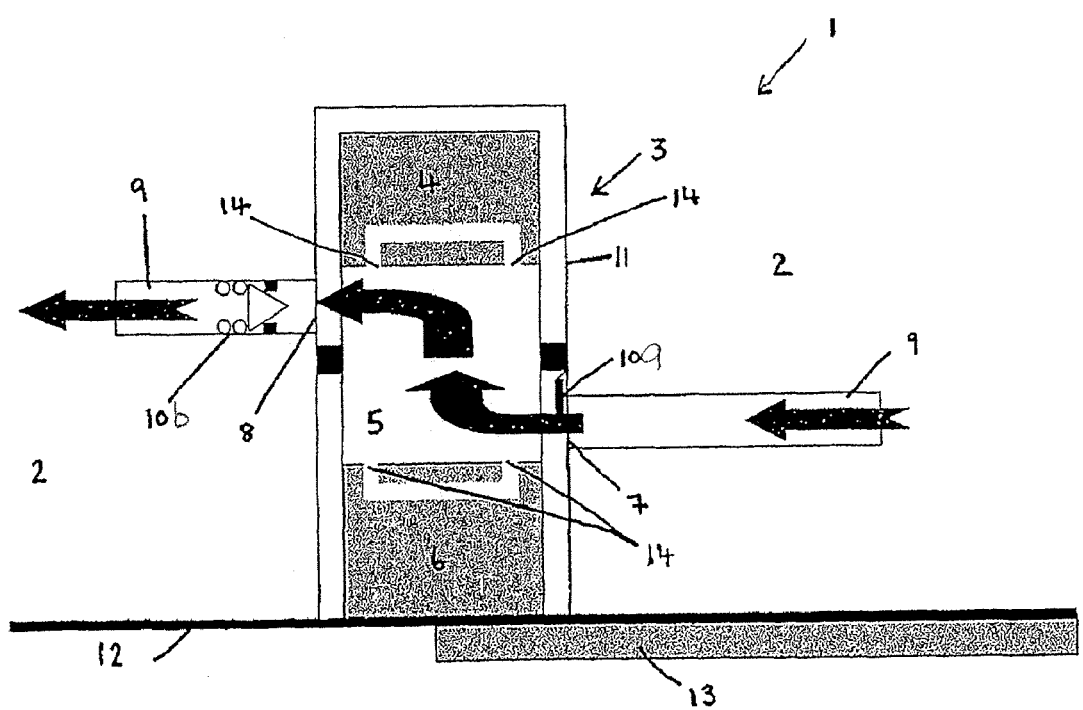
FIG. 2 is a schematic representation of a fuel tank assembly according to a second prior art arrangement.

FIG. 2 shows a schematic representation of a fuel tank assembly 1 according to a second prior art arrangement. Identical reference numerals have been used to indicate the parts corresponding to features described in relation to FIG. 1. The pump assembly 3 of FIG. 2 includes an electric motor 4, an electronics unit 6 and a pump 5. The electric motor 4 takes the form of a brushless direct current or switched-reluctance type motor. The electric motor 4 is powered by an electricity supply 13 which may be provided by variable frequency generators running at a speed proportional to the aircraft engine speed.

The electronics unit 6 houses the switching electronics that control the electric motor 4 and also, if required, the electronics required to convert power from ac to dc. The electronics unit 6 manages high currents and voltages in an integrated circuit package. Such an arrangement generates a significant amount of heat and, as a consequence, the electronics unit requires cooling.

The pump assembly 3 is housed in a fuel-flooded canister 11, projecting into the fuel tank 2 from the lower skin of the aircraft wing. The canister 11 is sealed to the inside tank wall 12.

When the motor 4 is operated, the pump 5 rotates and achieves a pumping action, taking fuel in at the inlet and expelling fuel from the pump at the outlet as shown by the arrows indicating fuel flow.

A proportion of the fuel in the pump is forced to flow through the electric motor 4, and a further proportion of the fuel in the pump 5 is forced to flow through the electronics unit 6. That fuel flow acts to effect cooling of the electric motor 4 and electronics unit 6 respectively. Appropriately located flame traps 14 prevent any small explosions reaching the pump 5, fuel pipes or fuel tank 2.

Figure 3:
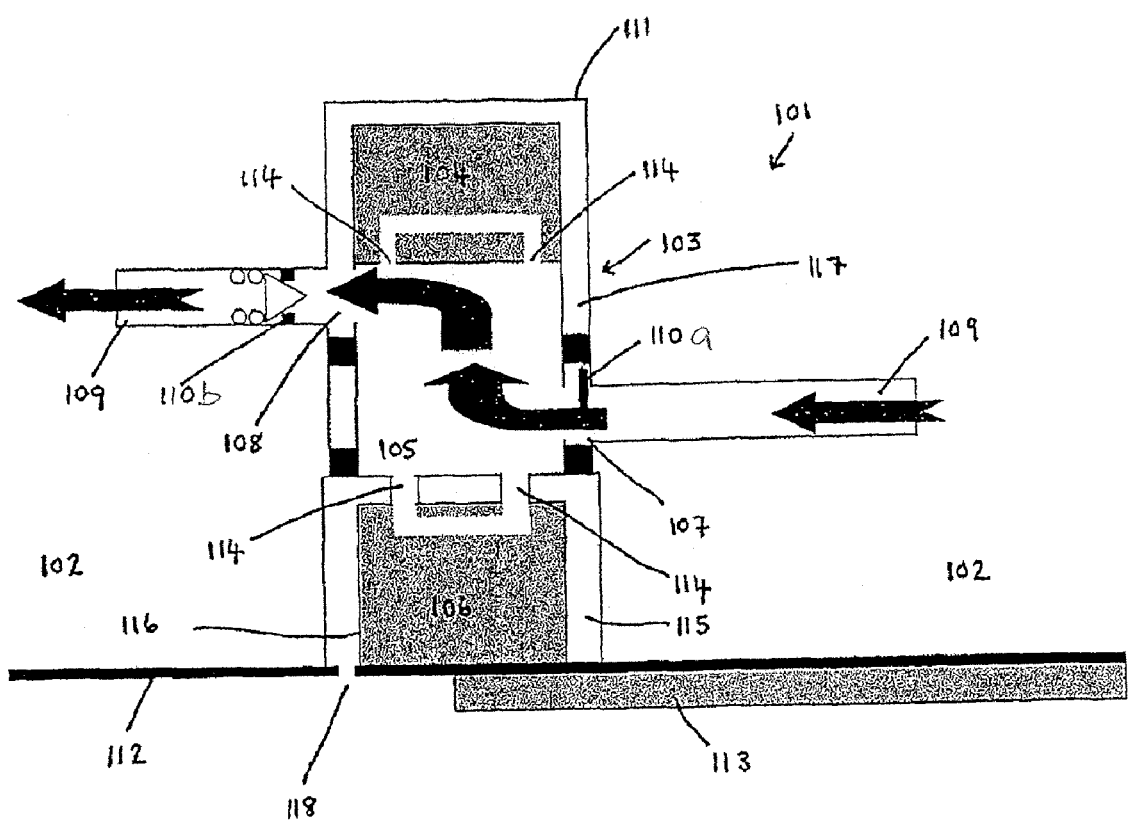
FIG. 3 is a schematic representation of an aircraft fuel tank assembly in accordance with a first embodiment of the present invention.

FIG. 3 shows an aircraft fuel tank assembly 101 in accordance with a first embodiment of the present invention.

The fuel tank assembly 101 is located in the wing of an aircraft, and includes a fuel tank 102 a canister 111 and a pump assembly 103. The pump assembly 103 arrangement shown is often used as a transfer pump, used to transfer fuel from one fuel tank to another. The pump assembly includes an electric motor 104, an electronics unit 106 and a pump 105. The pump has an inlet 107 and an outlet 108, each linked to the fuel tank 102 by fuel pipes 109, via a slide valve and a check valve 110a, 110b respectively.

The physical path between the electronics unit 106, housing control electronics, and the electric motor 104 is necessarily minimised to reduce radiated emissions and waveform deterioration. The electronics unit 106 thus forms an integral part of the pump assembly 103.

The fuel tank assembly 101 shown in FIG. 3 includes a pump assembly 103 that has a remote, rather than direct, inlet 107.

The pump impeller is capable of priming itself by suction. Since such a pump does not require fuel to be able to flow directly into the inlet 107 to prime the pump 105, the electronics unit 106 is located beneath the inlet 107 and, as shown, below the pump 105 and the electric motor 104. The electronics unit 106 of the pump assembly 103 of FIG. 3 is located directly on the fuel tank wall 112 and is powered by an electricity supply 113 which may be provided by variable frequency generators running at a speed proportional to the aircraft engine speed.

The electric motor 104 and the pump 105 are housed in a fuel flooded portion of the canister 111, whilst the electronics unit 106 is located in a dry bay 115. The dry bay 115 surrounds the electronics unit 106. The canister 111 forms the outer wall of the dry bay 115. The electronics unit 106 is housed in an insulating casing 116 that surrounds the electronics unit 106.

The dry bay 115 is filled with air and insulates the electronics unit from the fuel flooded portion 117 of the canister 111 and the fuel tank 102.

If a low-power electrical fault occurs inside the electronics unit 106, the insulating casing 116 acts as a first defense. In an extreme scenario, the fault may defeat all precautions inside the insulating casing 116 and burn through said casing. In such a situation, the dry bay 115 provides an additional layer of protection by virtue of physical separation from the main fuel tank. The dry bay 115 is designed and tested to withstand the force of any explosions which may occur if fuel or fuel vapour is ignited within it.

The dry bay 115 is linked to the outside of the fuel tank assembly 101 via a witness drain 118.

Because the dry bay 115 is connected to the exterior of the aircraft by the witness drain 118, any penetration of the tank wall 112 into the dry bay immediately becomes evident by a leaking of fuel through the witness drain 118. Such a witness drain allows damage to be rectified before any such fault can develop further.

When the motor 104 is operated, the pump 105 rotates and achieves a pumping action, taking fuel in at the inlet 107 and expelling fuel at the outlet 108, as shown by the arrows indicating fuel flow.

A proportion of the fuel in the pump 105 is forced to flow through the electric motor 104, and a further proportion of the fuel in the pump 105 is forced to flow through the electronics unit 106. That fuel flow acts to effect cooling of the electric motor 104 and electronics unit 106 respectively. Appropriately located flame traps 114 prevent any small explosions reaching the pump 105, fuel pipes or fuel tank 102.

Figure 4:
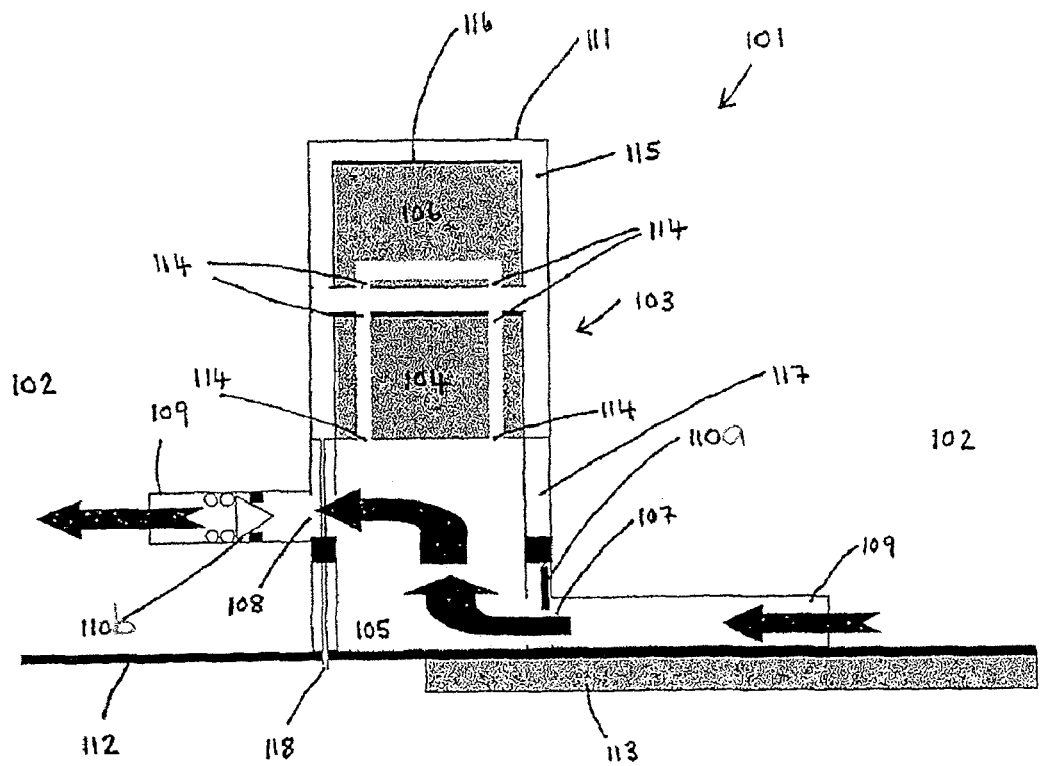
FIG. 4 is a schematic representation of an aircraft fuel tank assembly in accordance with a second embodiment of the present invention.

FIG. 4 shows an aircraft fuel tank assembly 101 in accordance with a second embodiment of the present invention. The second embodiment is an alternative to that shown in FIG. 3. It should be understood that the general operation of the pump assembly is similar to that described in relation to the embodiment shown in FIG. 3. The pump assembly arrangement shown in FIG. 4 is often used as a boost pump, to feed fuel to an aircraft engine.

The fuel tank assembly 101 is located in the wing of an aircraft and includes a fuel tank 102, a canister 111 and a fuel pump assembly. The fuel pump assembly of FIG. 4 includes an electric motor 104, an associated electronics unit 106 and a pump 105. The pump 105 has an inlet 107 and an outlet 108, each linked to the fuel tank 102 via fuel pipes 109, via a slide valve and a check valve 110a, 110b respectively.

The fuel tank assembly 101 shown in FIG. 4 has a pump assembly 103 that has a direct inlet 107. As a consequence, the pump 105 is placed directly on the fuel tank wall 112 and the inlet 107 located adjacent to the fuel tank wall 112. The electric motor 104 is located above the pump 105 and the electronics unit 106 is located above the electric motor 104. The electronics unit and electric motor are powered by an electricity supply 113 which may be provided by variable frequency generators running at a speed proportional to the aircraft engine speed.

In the arrangement of FIG. 4 only the pump 105 is located in a fuel flooded portion 117 of the canister 111.

The electronics unit 106 and the electric motor 104 are located in a dry bay 115. The dry bay 115 surrounds the electronics unit 106 and surrounds a substantial part of the electric motor. The canister 111 forms the outer wall of the dry bay 115. The electronics unit 106 is housed in an insulating casing 116 that surrounds the electronics unit 106.

The dry bay 115 is filled with air and insulates the electronics unit 106 from the fuel flooded portion 117 of the canister 111 and the fuel tank 102.

If a low-power electrical fault occurs inside the electronics unit, the insulating casing acts as a first defense. In an extreme scenario, the fault may defeat all precautions inside the insulating casing 116 and burn through said casing. In such a situation, the dry bay 115 provides an additional layer of protection by virtue of being fuel-free. The dry bay 115 is, however, designed and tested to withstand the force of any ignitions or explosions which may occur if fuel or fuel vapour is present within the air-space surrounding the electronics unit.

The dry bay housing the electronics unit and electric motor is linked to the outside of the fuel tank assembly by a witness drain 118.

Because the dry bay 115 is connected to the exterior of the aircraft by the witness drain 118, any penetration of the tank wall into the dry bay 115 immediately becomes evident by a leaking of fuel through the witness drain 118. Such a witness drain 118 allows damage to be rectified before any such fault can develop further.

When the motor is operated, the pump rotates and achieves a pumping action, taking fuel in at the inlet and expelling fuel at the outlet. The general flow of fuel through the pump assembly being indicated by arrows.

A proportion of the fuel in the pump 105 is forced to flow through the electric motor 104, and a further proportion of the fuel in the pump is forced to flow through the electronics unit 106. That fuel flow acts to effect cooling of the electric motor and electronics unit respectively. Appropriately located flame traps 114 prevent any small explosions reaching the pump, fuel pipes or fuel tank.

Whilst the present invention has been described and illustrated with reference to particular embodiments, it will be appreciated by those of ordinary skill in the art that the invention lends itself to many different variations not specifically illustrated herein. For example, rather than the dry bay being filled with air, other gas or material could be used to fill the dry bay.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft fuel tank assembly, comprising
a tank for holding fuel,
a canister in the fuel tank,
a fuel pump assembly, said fuel pump assembly being provided in the canister and comprising:
an electric motor,
a pump to be driven by the motor, and
an electronics unit electrically coupled to the motor for controlling the motor, and
a dry bay between the electronics unit and the canister.

2. An aircraft fuel tank assembly according to claim 1, wherein the dry bay comprises a witness drain on an outer wall of the fuel tank for visual indication of a breach of the dry bay.

3. An aircraft fuel tank assembly according to claim 1, wherein the electronics unit is adjacent to an inside surface of a wall of the fuel tank.

4. An aircraft fuel tank assembly according to claim 1, wherein the pump is adjacent to an inside surface a wall of the fuel tank.

5. An aircraft fuel tank assembly according to claim 1, wherein the canister is adapted to be, in use, partly fuel flooded.

6. An aircraft fuel tank assembly according to claim 1, wherein the fuel pump assembly is removably located within the canister.

7. An aircraft fuel tank assembly according to claim 1, wherein the electronics unit is arranged to be cooled by fuel that is passed through the electronics unit.

8. An aircraft fuel tank assembly according to claim 1, wherein the motor is arranged to be cooled by fuel that is passed through the motor.

9. An aircraft fuel tank assembly according to claim 1, wherein the pump is a remote inlet pump.

10. An aircraft fuel tank assembly according to claim 1, wherein the pump is a direct inlet pump.

11. In an aircraft, the improvement comprising a fuel tank assembly according to claim 1.

12. An aircraft fuel tank assembly according to claim 1, wherein the dry bay is filled with air or a gas.

13. A aircraft fuel tank assembly according to claim 1, wherein the electronics unit comprises a housing, the canister and the electronics unit housing together defining the dry bay.

14. A aircraft fuel tank assembly according to claim 1, wherein the dry bay is configured for withstanding the force of any ignitions or explosions which may occur if fuel or fuel vapor is present within the dry bay.

15. An aircraft fuel tank assembly according to claim 1, wherein the dry bay is filled with air and is configured for withstanding the force of any ignitions or explosions which may occur if fuel or fuel vapor is present within the air space surrounding the electronics unit.

16. An aircraft fuel tank assembly according to claim 1, wherein the motor is placed in the dry bay.

17. A kit for forming a fuel tank assembly, the kit comprising:
a canister installable in a fuel tank, and
an electronics unit for use with a fuel pump assembly, said fuel pump assembly being installable in the canister and comprising an electric motor and a pump to be driven by the motor, said electronics unit being electrically connectable to the motor for controlling the motor,
said electronics unit being assemble in said canister with a dry bay between the electronics unit and the canister.

18. A kit according to claim 17 further comprising said pump.

19. A kit according to claim 17, further comprising said electric motor.

20. A kit according to claim 19, wherein said motor is installable in said dry bay together with said electronics unit.

\* \* \* \* \*